United States Patent [19]
Tran et al.

[11] Patent Number: 5,549,477
[45] Date of Patent: Aug. 27, 1996

[54] INTEGRATED AIRCRAFT SURVIVABILITY EQUIPMENT IN-FLIGHT SIMULATION

[75] Inventors: My Tran; John E. Rasinski, both of Albuquerque, N.M.

[73] Assignee: Honeywell Inc., Minneapolis, Minn.

[21] Appl. No.: 494,311

[22] Filed: Jun. 23, 1995

Related U.S. Application Data

[63] Continuation-in-part of Ser. No. 977,471, Nov. 17, 1992, abandoned.

[51] Int. Cl.⁶ ............................. G09B 9/40; G01S 7/36; G01S 7/38
[52] U.S. Cl. .................... 434/5; 434/2; 342/13; 342/169; 364/423
[58] Field of Search ...................... 434/2.5; 342/13, 342/169; 364/423

[56] References Cited

U.S. PATENT DOCUMENTS

| | | | |
|---|---|---|---|
| 4,192,082 | 3/1980 | Deaton et al. ...................... | 434/5 X |
| 4,424,038 | 1/1984 | Tingleff et al. ...................... | 434/2 |
| 4,512,745 | 4/1985 | Mohon et al. ...................... | 434/43 |
| 4,740,909 | 4/1988 | Conklin et al. ...................... | 342/195 |
| 4,959,015 | 9/1990 | Rasinski et al. ...................... | 434/2 |
| 5,122,801 | 6/1992 | Hughes ...................... | 342/13 |

*Primary Examiner*—Gilberto Barron, Jr.
*Attorney, Agent, or Firm*—Kenneth J. Johnson; George A. Leone, Sr.

[57] ABSTRACT

An in-flight simulator for an integrated aircraft survivability equipment system controlling radar warning receiver and a radar jammer with countermeasures control provides a training module which emulates the existence of airborne threats. The airborne threats are provided in real time as if they were detected by a threat detection system such as a radar warning receiver or a radar jammer. A list of threats is provided for either a radar warning receiver or pulse radar jammer, a continuous radar jammer, an RF/IR missile approach detector or a laser that threat on a display, includes that threat in a candidate list and executes various threat proximity algorithms with the candidate list. The invention determines whether the threat is within the range hidden by terrain or beyond the horizon. The threat simulator performs aircraft survivability equipment sensor model simulation. Threats are also prioritized.

22 Claims, 15 Drawing Sheets

DATA PRIORITIZATION ALGORITHM

ASE SENSOR MODEL

CWJ SENSOR MODEL

PRJ SENSOR MODEL

LASER DETECTOR SENSOR MODEL

MISSILE APPROACH DETECTOR SENSOR MODEL

DATA PRIORITIZATION ALGORITHM

INTEGRATED AIRCRAFT SURVIVABILITY EQUIPMENT IN-FLIGHT SIMULATION

UNITED STATES GOVERNMENT RIGHTS

The United States Government has acquired certain rights in this invention through government Contract No. DAA B07- 87-C-H041 awarded by the Department of the Army.

This application is a continuation-in-part of application Ser. No. 07/977,471, filed on Nov. 17, 1992 abnd.

BACKGROUND OF THE INVENTION

1. Field of the Invention

This invention relates to an integrated aircraft survivability equipment in-flight simulator and more particularly to a simulator which provides displays and audible warnings of in-flight threats and countermeasures responses.

2. Discussion of the Prior Art

The training of pilots to use aircraft survivability equipment is an important undertaking. Similarly the training of pilots to use an integrated aircraft survivability equipment system is equally important.

Prior art interactive electronic countermeasures simulation systems provide displays of in-flight threats and countermeasures responses which look just like those which would occur in actual mission. See U.S. Pat. No. 4,959,015.

In the prior art, individual aircraft survivability equipment (ASE) sensors are used as stand-alone systems, for training and under normal use. The use of such systems in a stand-alone manner results in high pilot workloads. Further, in such systems only a limited amount of threat data is presented to the pilot or student. Data provided by various ASE subsystems such as pulse radar jammers, CW radar jammers and missile approach detectors have previously not been used to provide a comprehensive and coherent picture of the threat environment or training environment. Thus prior art systems often do not present adequate data in a readily understood format to enable the pilot or student to quickly and completely assess a given threat environment or training environment. The prior art does not provide an integrated aircraft survivability in-flight simulation capability.

It is therefor the motive of the invention to provide an in-flight simulation system for an integrated aircraft survivability equipment (IASE) system.

SUMMARY OF THE INVENTION

An IASE can automatically reconfigure ASE equipment modes based on time or aircraft location. In the training mode, the operator has an opportunity to see this feature work just as it does in a real mission. The training mode also provides system setup training for automatic system reconfiguration.

The IASE can recognize a threat that is being detected by more than one detector in the suite (i.e., a radar warning receiver and a jammer) and display this threat non-redundantly. The training module emulates this capability for threats on the threat list which are detected by more than one detector in the ASE suite.

The IASE causes an "X" to be placed over a threat which is currently being jammed. The training module emulates this.

Threats which are detected by a jammer and not by a radar warning receiver have not been displayed in the prior art. The IASE scheme displays these threats to the pilot on the periphery of the display. This depiction is emulated in the training scheme.

The IASE has the capability to provide available backup threat indications from the entire suite of ASE instead of relying solely on radar warning receivers. This data is represented in a unique way to differentiate it from the normally acquired threat data. This unique representation is emulated in the training mode when a threat is detected and a radar warning receiver (RWR) is intentionally shut off to imitate the effect, during training, of losing an RWR. This also shows the pilot the limitations of his system when an RWR is lost, and help train him in decision-making about whether to continue a mission with equipment outage.

The IASE records threat data as threats occur. This capability is emulated in the training module.

The real system has an automatic chaff initiation capability against an RF missile. This capability, missile coming signal as well as chaff count change, is emulated in this training scheme.

This embedded training scheme alleviates the need for tying up real ASE in the aircraft to do training. ASE equipment usage training can now be done in the field before real equipment is fielded.

When software changes are made to the real IASE devices, the revised software can be utilized in training before it is implemented in the field.

Since the training is software based, any change in threat characteristics are easily programmed to be just like real combat.

Different embodiments may be used to model various threat detection capabilities such as:

1. simple earth curvature;
2. intervisibility based on terrain masking; and
3. inclusion of a digital map database in the system.

The invention provides an ASE Embedded Training simulation system that trains pilots in an integrated ASE environment. Pilots using this system are familiarized with data presentation, system configuration, countermeasures, and develop tactics and procedures for training. As indicated above, the invention may also provide intervisibility terrain masking of threats based on a digital map's data plus platform related data. Some training features are listed below:

1. Automatic system reconfiguration based on time, altitude and location;
2. Recognition of RWR jammed and correlated threats;
3. Recognition of non-traditional RWR threats from other ASE sub-systems such as Jammers and Missile Detectors;
4. Recognition of back-up data threats to RWR from partial to complete;
5. Recognition of the limitation of threat detection capability of each sub-system; and
6. Recognition of an incoming missile and initiation of evasive maneuvers.

One objective of this invention is to provide training capability, in the air and on the ground, of all features of a fully integrated ASE system.

It is another object of the invention to reduce the real asset cost required for training.

It is a further object of the invention to allow for flexible pilot training time.

It is yet another object of the invention to provide a trained pilot with a smooth transition to actual ASE equipment and the real threat environment.

It is a further object of the invention to help develop a pilot's ability in tactics and procedures.

It is a further object of the invention to improve aircraft survivability

It is a further object of the invention to add the flexibility to change the threat data base to include new threats and different system capabilities.

It is a further object of the invention to enhance training presentations for instructors.

It is a further object of the invention to improve training capability through accurate modeling of threats and sensors.

It is a further object of the invention to expand the training capability of threat avoidance using terrain masking with the incorporation of digital map data, the radar altimeter, global positioning system (GPS) and Inertial navigation.

Other objects, features and advantages of the present invention will become apparent to those skilled in the art through the description of the preferred embodiment, claims and drawings herein where like numerals refer to like elements.

BRIEF DESCRIPTION OF THE DRAWINGS

FIG. 15 is a block diagram summarizing the operation of the present invention as shown in the previous figures.

DESCRIPTION OF THE PREFERRED EMBODIMENT

Figure 1:
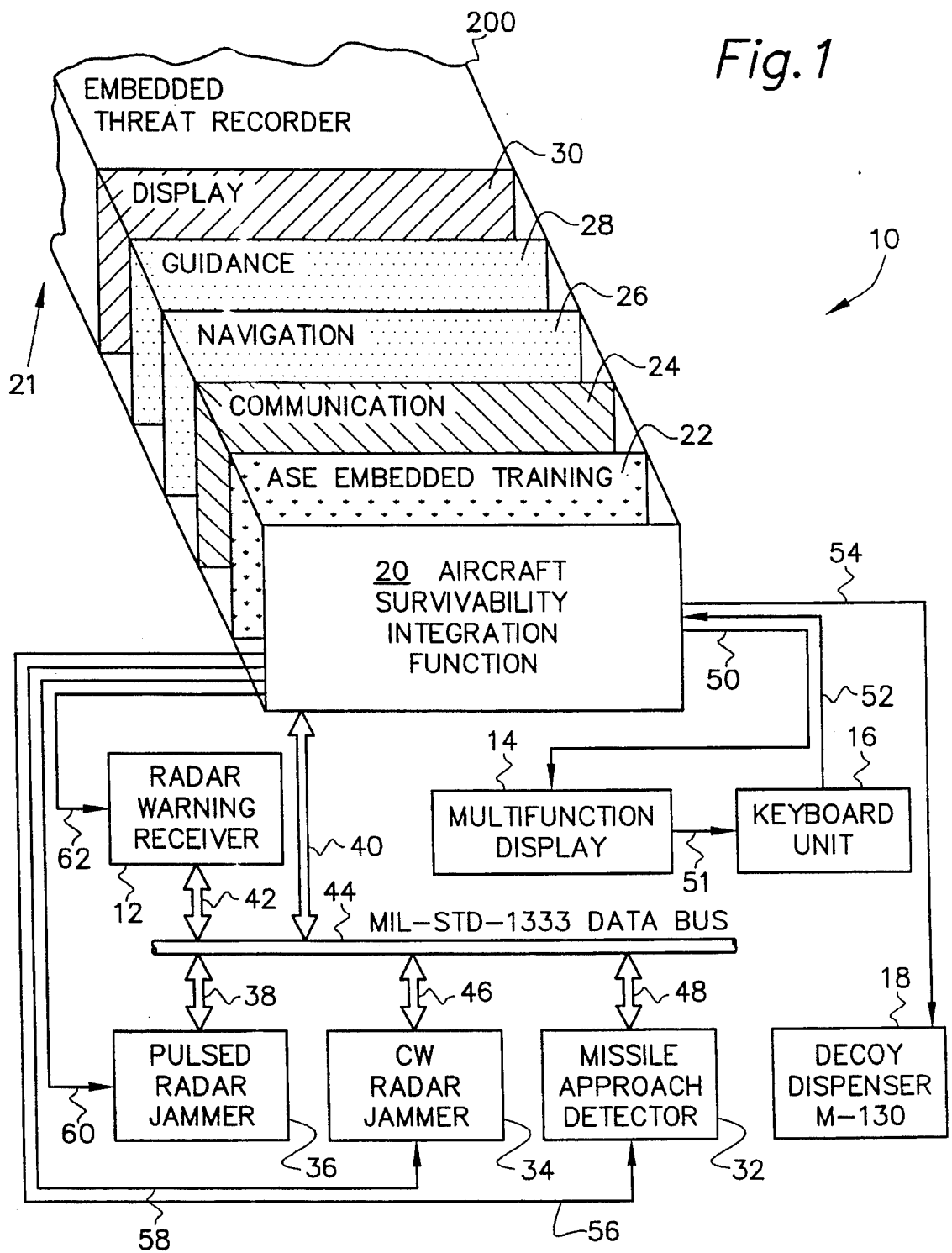
FIG. 1 shows a high level system diagram of one embodiment of the aircraft survivability integration equipment system as employed by the invention.

Now referring to FIG. 1, a high level system diagram of one embodiment of the aircraft survivability integration equipment system 10 as employed by the invention is shown. Aircraft survivability system 10 includes aircraft survivability integration functions 21, a multifunction display 14, a keyboard unit 16, a continuous wave (CW) radar jammer 34, a missile approach detector 32, a pulsed radar jammer 36, a radar warning receiver 12 and a decoy dispenser 18. The aircraft survivability integration functions 21 further include an aircraft survivability integration function 20, an aircraft survivability equipment embedded training apparatus 22, communication apparatus 24, navigation apparatus 26, guidance apparatus 28, display apparatus 30 and an embedded threat data recorder 200. The radar warning receiver 12, pulsed radar jammer 36, CW radar jammer 34, missile approach detector 32, multifunctional display 14, keyboard unit 16 and decoy dispenser 18 are standard units. The radar warning receiver 12, pulsed radar jammer 36, CW radar jammer 34 and missile approach detector 32 all communicate with each other and the aircraft survivability functions 21 through a data bus 44. The data bus 44 may advantageously be a MIL standard 1553 data bus or equivalent. In one example of the invention, the radar warning receiver (RWR) 12 communicates with the data bus through communication lines 42, the pulsed radar jammer 36 communicates with the data bus through communication lines 38, the CW radar jammer 34 communicates to the data bus by communication lines 46, and the missile approached detector 32 communicates to the data bus by communication lines 48. In this way, the sensors in the system which comprise the radar warning receiver 12, pulsed radar jammer 36, CW radar jammer 34 and missile approach detector 32 can receive and transmit data to the aircraft survivability integration functions 21. In addition, the aircraft survivability integration functions 21 may be hardwired to the plurality of sensors. This introduction of hardwired lines to the individual sensors provides a redundancy feature in the system which guards against failure of the data bus 44. For example, the radar warning receiver may be wired by lines 62 into the aircraft survivability integration function 20, the pulsed radar jammer by lines 60, the CW radar jammer by lines 58 and the missile approach detector by lines 56. Hard wire and bus interfaces are typically provided with such ASE devices as are conventionally available.

The multifunction display 14 is controlled by the display apparatus 30 and is wired to the display apparatus 30 in the aircraft survivability integration function 20 by lines 50. The multifunction display also interfaces with the keyboard unit 16, which may be a standard keyboard unit, by lines 51. The keyboard unit 16 is also wired into the communication apparatus 24 by lines 52. Control lines 54 are connected from the ASE integrated functions 21 to the decoy dispenser 18.

Figure 2:
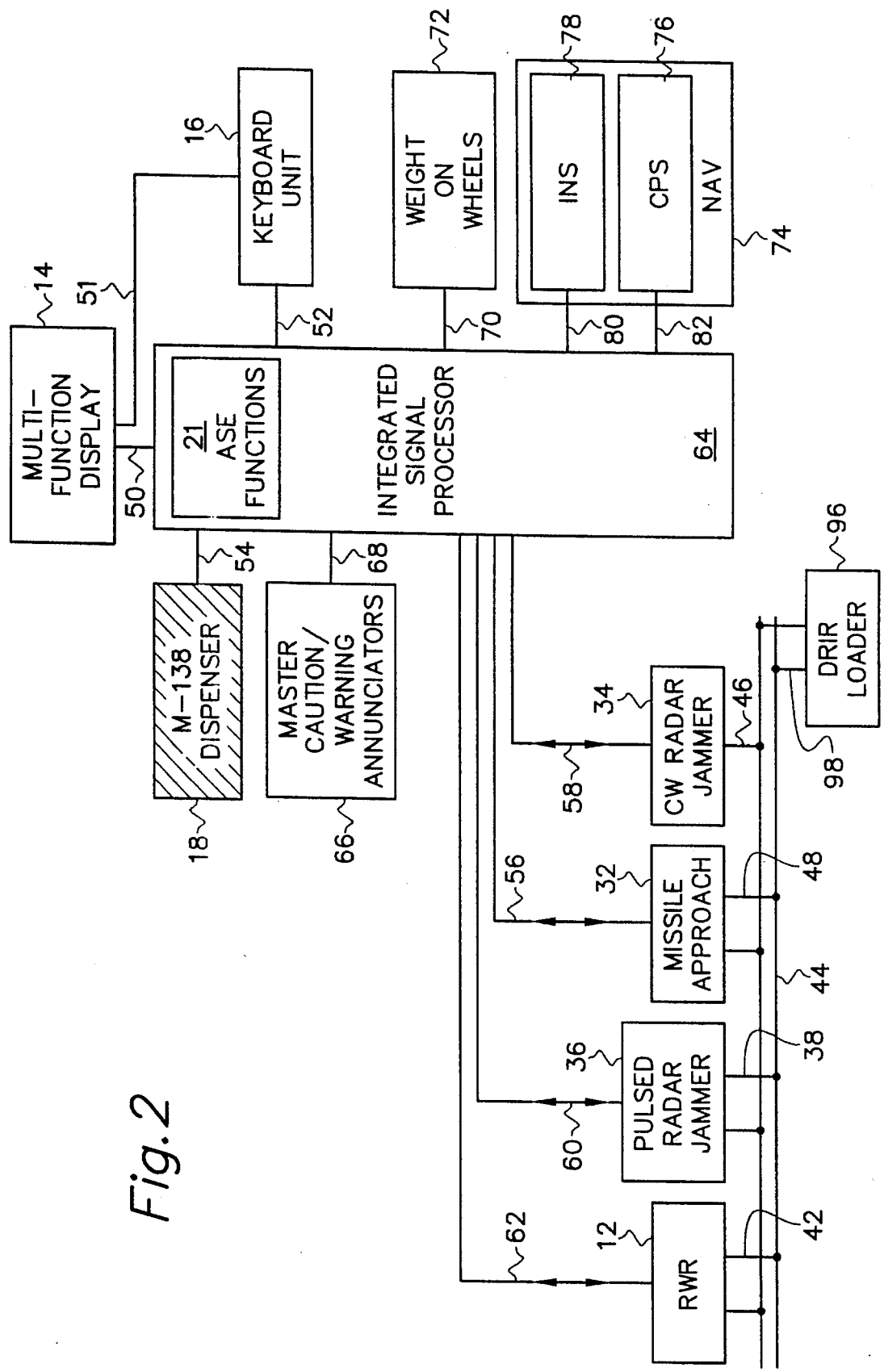
FIG. 2 shows a more detailed block diagram of the aircraft survivability equipment integration system 10 which is integrated into an aircraft survivability equipment/avionics control system (ASE/ACS).

Now referring to FIG. 2, a more detailed block diagram of the aircraft survivability equipment integration system is shown as integrated into an aircraft survivability equipment/avionics control system (ASE/ACS). The aircraft survivability equipment/avionics control system is used to integrate control and display of an ASE suite of devices such as the radar warning detector and jammers as well as selected military communication and navigation systems. Those skilled in the art will understand that the configuration shown in the block diagram of FIG. 2 is one example and does not so limit the invention. In the system shown in FIG. 2, the aircraft survivability integration functions 21 is embedded in an integrated signal processor 64. The integrated signal processor 64 may advantageously comprise a microprocessor, digital signal processor or an equivalent device. Also connected to the integrated signal processor 64 is a master caution/warning annunciator 66 which is connected to the integrated signal processor 64 by line 68, a weight on wheels sensor 72 which is connected by line 70, and navigation systems 74 which are connected by lines 80 and 82. The navigation equipment advantageously includes an inertial navigation system (INS) 78 and a global positioning system (GPS) 76. Communication apparatus 90 is connected to the signal processor 64 by communication line 92 and is further connected to the communication bus 44 by line 94. A data loader 96 is connected via lines 98 to bus 44. The data loader 96 is a conventional data loader and may be used to input flight information and other parameters into the signal processor 64 prior to an aircraft embarking on a particular flight plan. The other components are as shown in FIG. 1 and operate similarly. Those skilled in the art will recognize that the ASE equipment including the radar warning sensor, jammers and missile approach detector are well known standard units.

The weight on wheels sensor 72 is a known sensor which communicates with the signal processor 64 and provides an enable signal 70 which enables certain built-in test functions to be performed when the aircraft is on the ground. These built-in test functions may be a part of the radar warning receiver 12, the pulsed radar jammer 36, the missile approach detector 32 and the continuous wave radar jammer 34.

The integrated signal processor 64 also serves as a bus controller using well known control signals. The four ASE subsystems, RWR 12, pulsed radar jammer 36, missile approach detector 32 and CW radar jammer 34 may be advantageously configured as remote terminals.

The ASE/ACS system provides a fail active state with regard to the ASE suite. If, for example, the integrated signal processor 64 should fail, or power is removed from the unit, the ASE subsystems may assume their most active states. The ability to fire flares and chaff is not impaired by a data bus failure in this redundant configuration. In order to insure this, flare and chaff fire switches are wired directly into the decoy dispenser 18 and are not controlled by the ASE/ACS in the event of a data bus failure. In the alternative, the decoy dispenser 18 may be fired automatically through the aircraft survivability integration functions 21 when an appropriate signal is received from any one or more of the subsystem sensors, such as the radar warning receiver.

Figure 3:
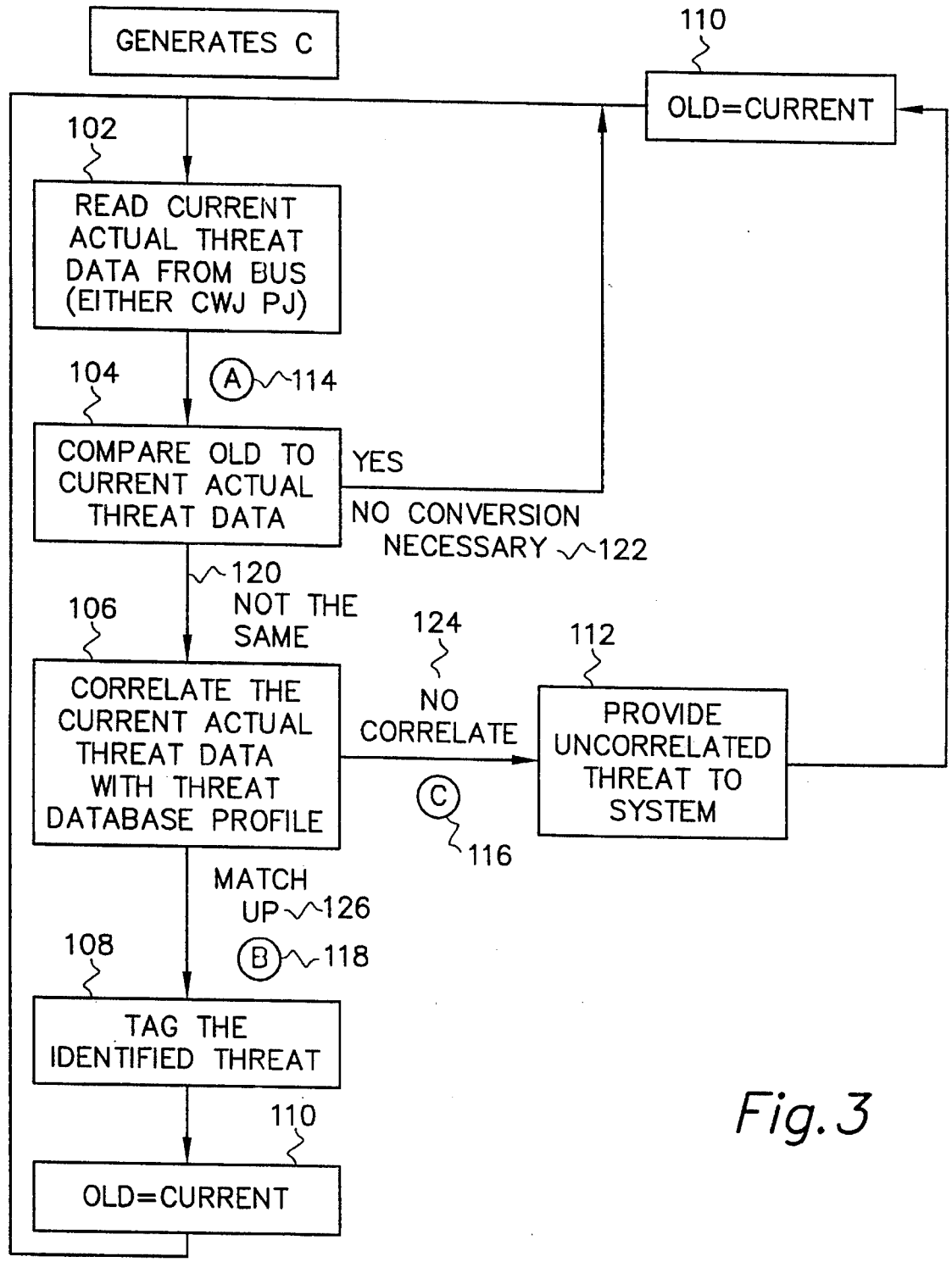
FIG. 3 shows a method of the invention that is used to convert the current actual threat data, that is sent to the system bus from either the continuous wave radar jammer or the pulsed radar jammer, to either an un-correlated threat or an identified threat.

Now referring to FIG. 3 which shows the method of the invention used to convert current actual threat data from the system data bus from either the continuous wave radar jammer or the pulsed radar jammer to either an un-correlated threat or an identified threat. The threat data base is composed of a number of sub-elements and parameters. A threat data base may be input into the system and stored in memory by any well-known means. The threat data base advantageously contains threat parameters including threat types which include, in one preferred embodiment of the invention, a missile, anti-aircraft gunfire, a fighter, or other threats identified by the aircraft. Each threat type has an associated set of parameters which, in one preferred embodiment of the invention, include frequency of the threat signal, amplitude of the threat signal, pulse repetition frequency, pulse repetition interval, angle of arrival, and operational mode of the threat. Those skilled in the art will recognize that other parameters may be used in the method of the invention. Those skilled in the art will recognize that either all the parameters may be included in the threat data base or just a few. The threat data base comprises a profile of known threats that may be encountered by the aircraft.

FIG. 3 shows the processing of data from a current actual threat as read from the jammer radars. The threat data is provided on the data bus 44 as shown in FIGS. 1 and 2. The process of the invention starts at step 102 wherein the current actual threat data from the data bus is read. This data is also available directly to the system processor 64 from the hardwire connections 58, 60 and from the radar jammers 34, 36. Those skilled in the art will recognize that the bus method of communication provides more robust threats. The process flows to step 104 where previously received old threat data is compared to just received current actual threat data. Step 104 compares on a logical basis the old detected threat and the current detected threat. The comparison of different threat data occurs in different time slices. The old threat data occurred at the last sample period as indicated in step 110. The comparison of the various threat data parameters can occur either through known accepted methods such as boolean comparisons or threshold comparisons which compare an upper bound to a lower bound of the parameters, or a comparison of whether or not the parameters are within a window of parameter values. Alternate methods of comparison understood by those skilled in the art may be used such as fuzzy logic-based comparisons. The process flows to step 106 if the system is in a state that indicates the old and the current actual threat data is not the same. At step 106 the process correlates the current actual threat data with threat profiles from the threat data base. In one preferred embodiment of the invention, the current actual threat is compared against each element of the threat data base using the comparison methods used in step 104. If the threats correlate and match up as indicated by state 126, the process flows to step 108 where the identified threat is tagged. The process then flows to step 110 to set the old actual threat data to equal the current actual threat data. The process then returns to step 102.

Figure 5:
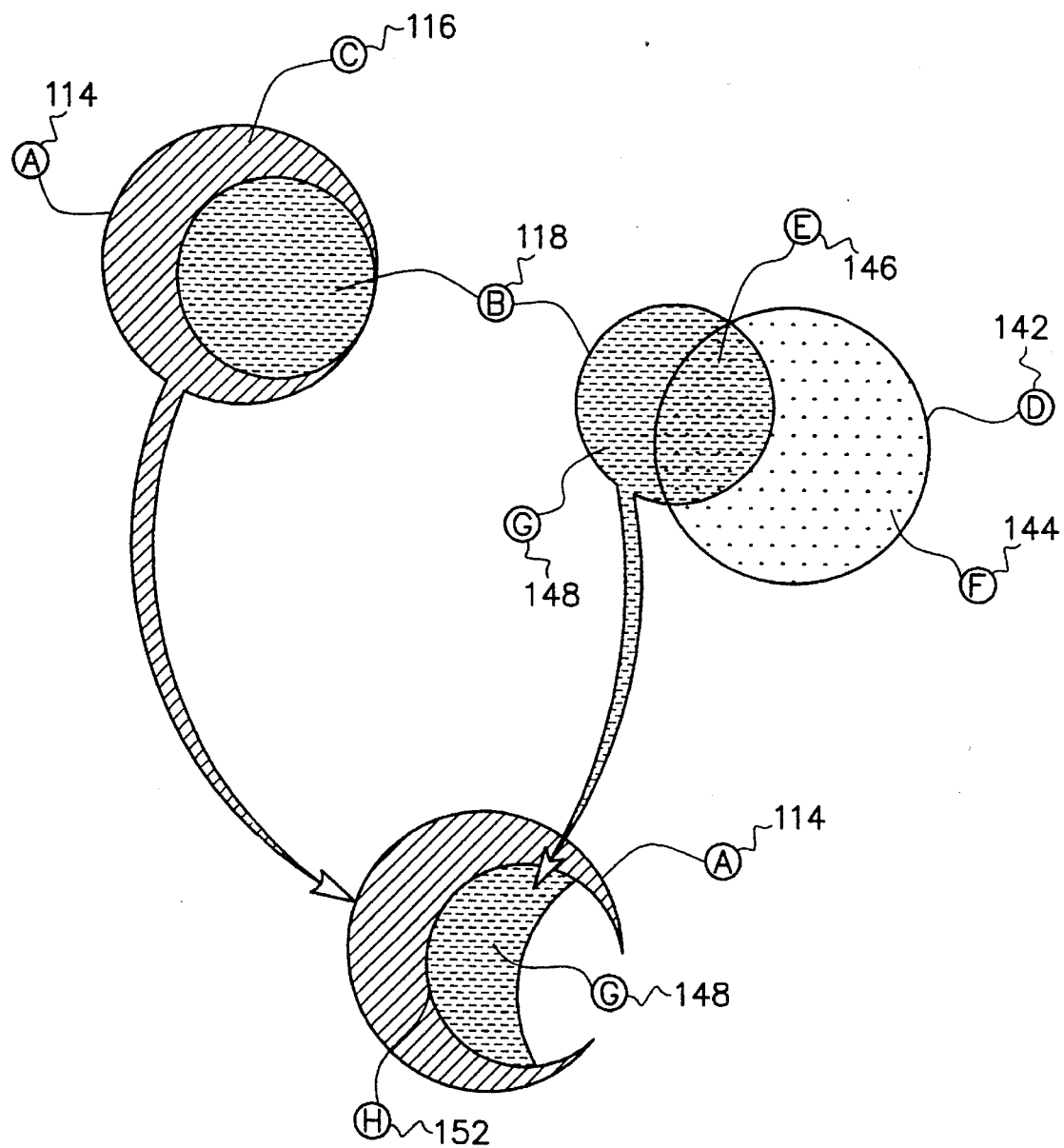
FIG. 5 shows a data flow diagram showing the various data sets of the invention in a Venn diagram fashion.

In the method of the invention, the processor creates different sets of data which are correlated as shown in FIG. 5 which is described in detail below. At step 102, the process takes data from one of the radar jammers which is designated as data set A 114. In step 106, a data set labeled C 116 is generated which represents an un-correlated current actual jammer threat data. This data is presented to process step 112 to provide un-correlated threat data to any system using the method of the invention. The process then flows to step 110 which sets the old threat data to the current threat data. Next, the process returns to step 102. The process step 106 generates a data set called B 118 which is the matched-up correlated current actual jammer threat data. If in process 104 the comparison to check old threat data against current threat data results in the old and the current being the same, then the process flows to step 102 to read the next current actual threat data from the bus or from the hardwired system.

Figure 4:
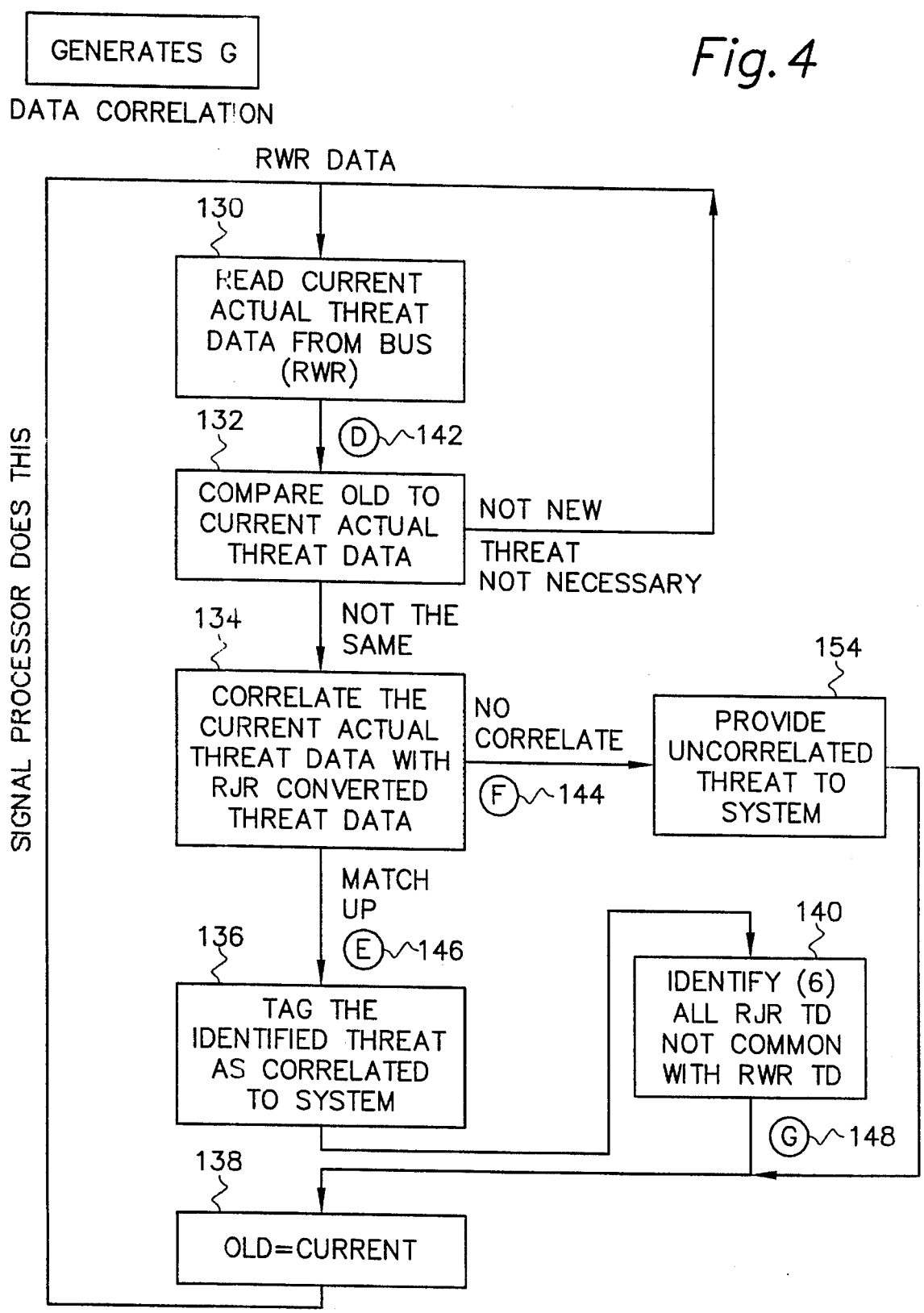
FIG. 4 shows one method of the invention used to perform data correlation on radar warning receiver data.

Referring now to FIG. 4, the method of the invention used to perform data correlation on radar warning receiver data is shown. The process starts at step 130 where the current actual threat data from the radar warning receiver is read from the data bus. The process 130 generates data set D 142. Data set D is then used by process step 132 to compare the current actual threat data with old threat data from the radar warning receiver. If the two threats are identical (i.e. the old and the current in step 132), the process returns to step 130 to read another actual threat. Step 130 reads in all available threats from the radar warning receiver. The set of all possible threats is commonly known as a threat set. In step 132, the old threat set is compared against a current actual threat set data. If the current actual threat set data is not a new threat set, then the process flows to 130 to scan another set of threats. In step 132, if there is a new threat, the process flows to step 134 to correlate the current actual threat set with the radar jamming receiver conferred as threat data which is generated in FIG. 3. The threat data is indicated by data set B. If the converted threat data set B correlates with the current actual threat data set, then the process flows to 136 to tag the identified threat set as a correlated new threat to the system using the method of the invention. The process then flows to step 140 where the process identifies a set G 148 which is all radar jamming receiver threat data that is not common with the radar warning receiver threat data. The process then flows to step 138 to set the old threat data set as the current threat data set for the next comparison and the next time cycle. The process then flows to 130 to read the next current actual threat data set from the bus.

If in step 134 there is no correlation between the current actual threat data set with the radar jamming receiver converted threat data set, the process flows to step 154, generates an un-correlated threat set F 144, and provides the un-correlated threat set to the system using the method of the invention.

As is the case with the jammer data, when implementing the method of the invention to convert the current actual threat data set from the radar warning receiver to either a correlated or un-correlated threat, the process creates various other data sets. Data set D 142 is the current active threat data set from the bus. Data set E 146 is the correlated current actual threat data with the radar jamming receiver converted threat data. Data set F 144 is the un-correlated data. Data set G is the data which is not common with the radar warning receiver threat data 148.

Now referring to FIG. 5, a data flow diagram showing the various data sets of the invention in a Venn diagram fashion is shown. Data set A 114 is the current actual jammer threat data. Data set B 118 is the correlated current actual jammer threat data or the converted set data. Data set C 116 is the un-correlated actual jammer threat data. Data set D 142 is current actual radar warning receiver threat data. Data set E 146 is the common current threat data. Data set F 144 is the un-correlated radar warning receiver threat data. Data set G 148 is the radar jamming receiver threat data which is not common with the radar warning receiver threat data. Data set G is used subsequently to generate a complementary threat set H 152. Data set H 152 is the complimentary threat data set which represents the summation of data sets C and G.

The two basic processes shown in FIG. 3 and FIG. 4 are joined in this data flow diagram of FIG. 5. Two basic data sets include the data from the radar jamming receivers which is data set A 114, and from the radar warning receiver which is data set D 142. The process of FIG. 3 generates the data set B 118 which represents all correlated current actual jammer threat data sets. This is used by both processes shown in FIG. 3 and FIG. 4 to create a complimentary threat. The data set B 118 is subtracted from data set A 114 to generate data set C 116 which is the un-correlated current actual jammer threat data. Data set B 118 is also used along with the data set D 142 (current actual radar warning receiver threat data) to generate the intersection of the two data sets E 146. The data set E 146 is the common current threat data. The common current threat data set E 146 is then subtracted from data set B 118 to generate a new data set G 148. Data set G 148 represents the radar jamming receiver threat data that is not common with the radar warning receiver threat data. That is, data set G 148 represents data from threats which are detected by the jammers, but not the radar warning receiver. Data set G 148 and data set C 116 are combined to create data set H 152 which is called the complementary threat data. The complementary threat data set H 152 comprises threats that are complementary to the already identified threats which have been identified by the radar warning receiver.

Figure 6:
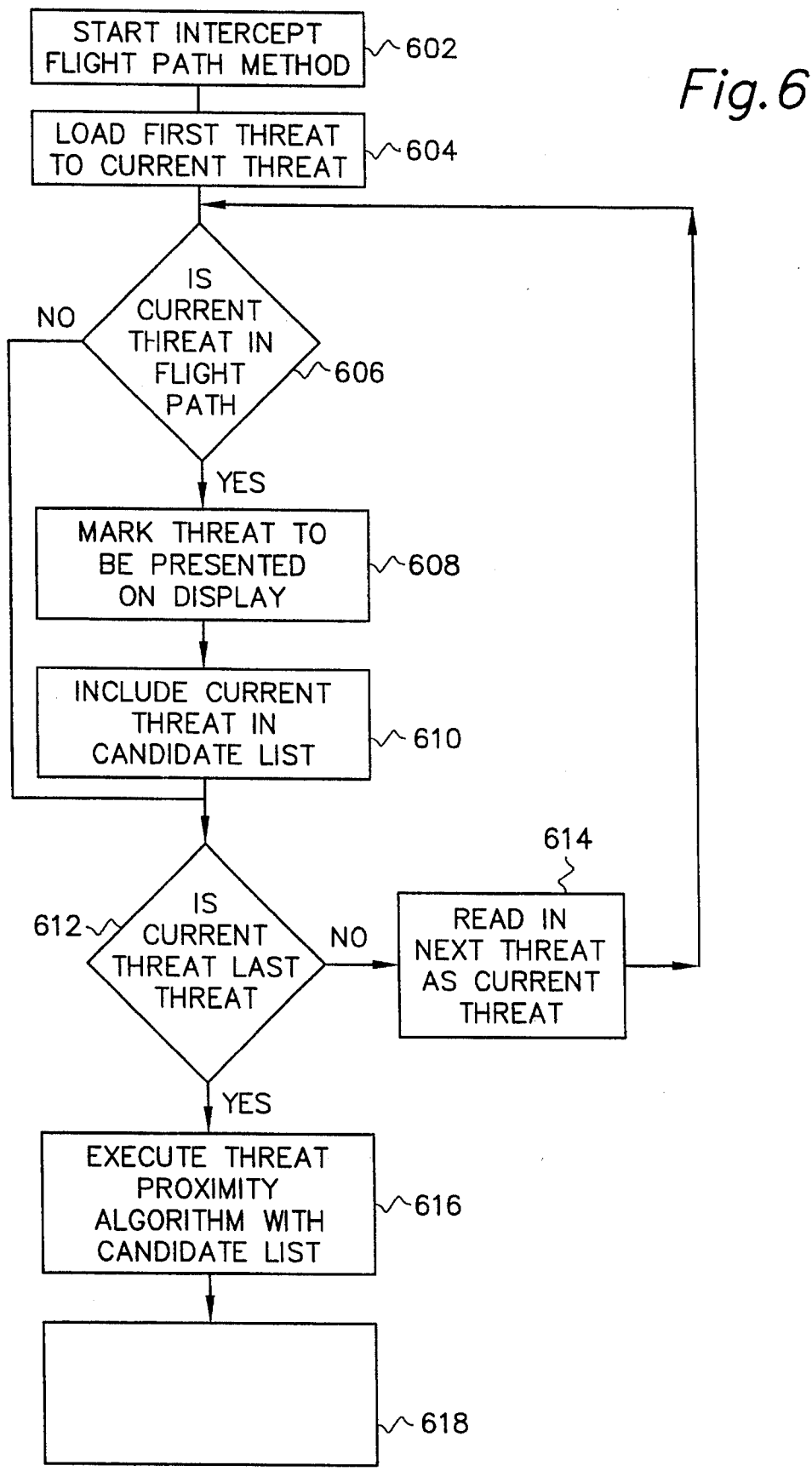
FIG. 6 shows a schematic block diagram of the intercept flight path method of the invention.

Now referring to FIG. 6 which shows a process flow diagram for the method of the invention to determine the intercept flight path of a threat. The process starts at step 602 to start the intercept flight path method. The process then flows to step 604 to load the first threat into the current threat data area. The process then flows to decision block 606 to determine whether the current threat is in the flight path of the aircraft. If it is not, the process flows to decision block 612. If it is, the process flows to process block 608 to mark the threat to be presented on the display. The process then flows to process block 610 to include the current threat in the candidate list. The process then flows to decision block 612 where the current threat is determined to be the last threat. If it is the last threat, then the process flows to step 616. If it is not the last threat, the next threat is read as the current threat in process step 614. In process step 616, the threat proximity method of the invention is executed with the candidate list. The process then flows to the end at step 618.

Figure 7A:
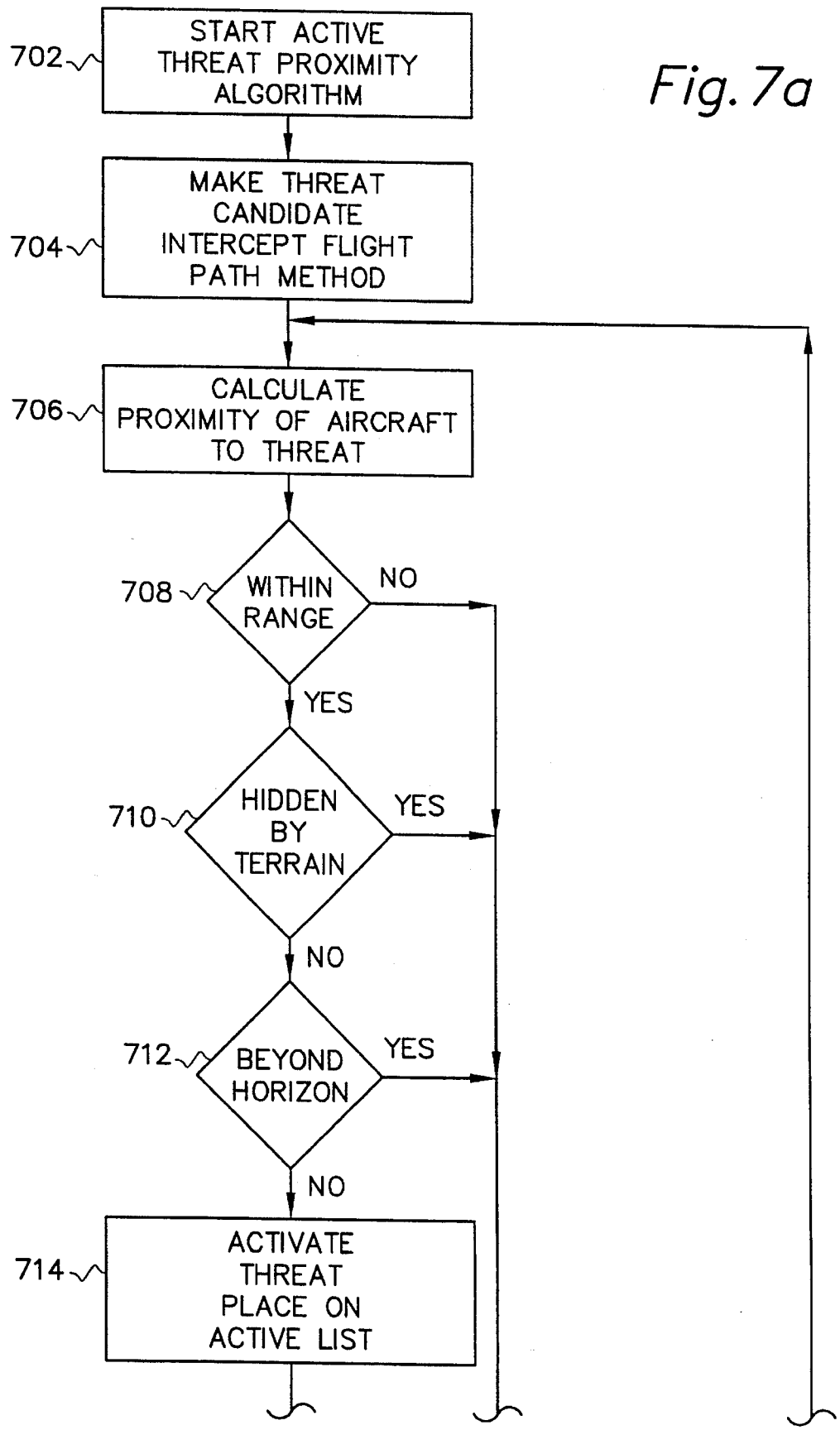
FIG. 7 shows a schematic block diagram for the active threat proximity method of the invention.
Figure 7B:
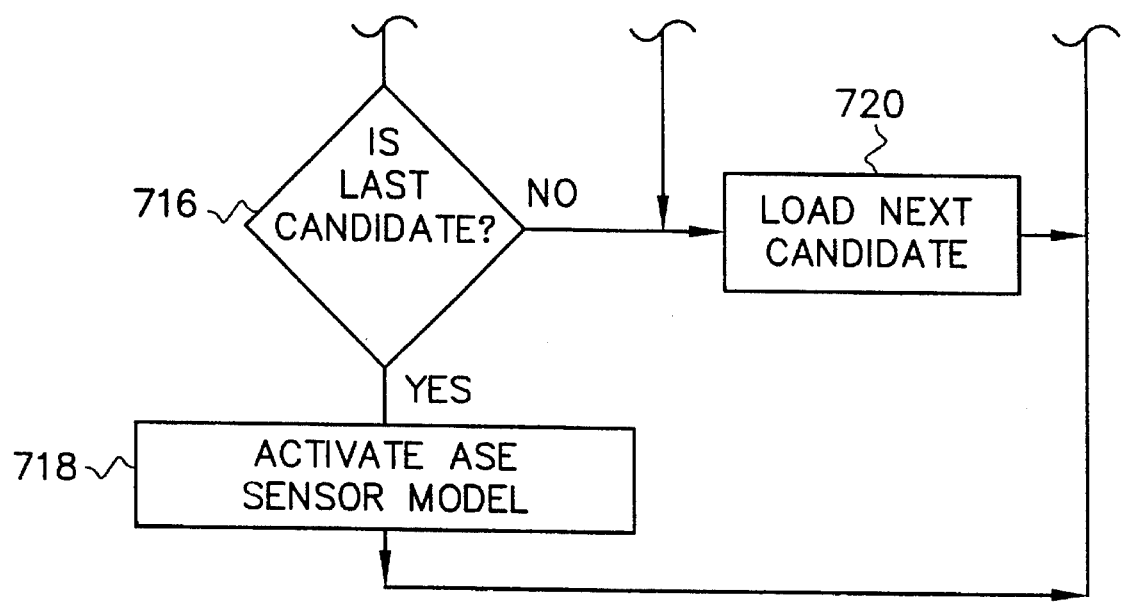

Now referring to FIG. 7 which shows a detailed schematic process flow diagram of a threat proximity method of the invention. The active threat proximity method starts at step 702. The process flows to step 704 and implements the threat candidate intercept flight path method. The process then flows to step 706 to calculate the proximity of the aircraft to the threat. Then the process flows to decision block 708 to determine whether or not the aircraft is in the range. If it is not, the process flows to step 720 to load the next candidate. If the threat is within the range of the aircraft, the process flows to decision block 710 to determine whether or not the threat is hidden by the terrain. If it is, the process flows to step 720 to load the next candidate. If the threat is not hidden by the terrain, then the process flows to step 712 to determine whether or not the threat is beyond the horizon. If the threat is beyond the horizon, the process flows to step 720 to load the next candidate threat. If the threat is not beyond the horizon, the process flows to step 714 to activate the threat and place the threat on the active list. The process then flows to decision block 716 to determine if it is the last threat candidate. If it is not, the process flows to step 720 to load the next threat candidate. If it is the last threat candidate, the process flows to step 718 to activate the aircraft survivability equipment sensor model. The process then flows back to step 706 and repeats until the end of the mission.

Figure 8:
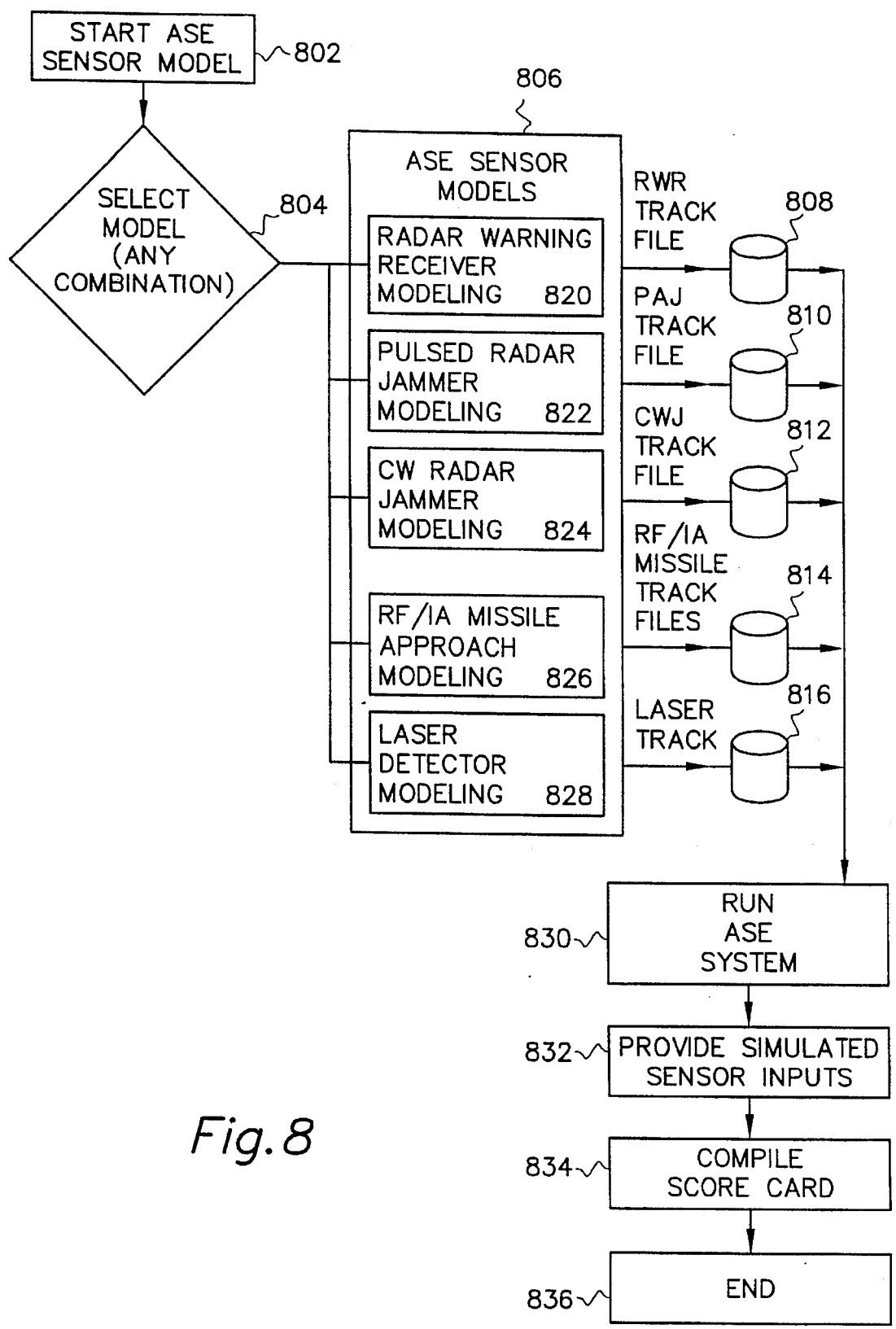
FIG. 8 shows a schematic block diagram for the aircraft survivability equipment radar warning receiver sensor model.

Now referring to FIG. 8 which shows the aircraft survivability equipment sensor model method of the invention. The process of FIG. 8 starts at step 802 and flows to select a model or any combination of a model in step 804. The process provides five basic models of the aircraft survivability equipment sensor, the first being the radar warning receiver model in step 820, the second being the pulse radar jamming model in step 822, the third being in the continuous wave radar jammer model in step 824, the fourth being the RF/IR missile approach model in step 826 and the fifth being the laser detect model in step 828. Each model generates a track file. The radar warning receiver generates a radar track file 808. The pulse radar jammer model generates a pulse radar jammer track file 810. The continuous wave radar jammer model generates a continuous wave jammer track file 812. The RF/IR missile approach model generates an RF/IR missile track file 814. The laser detector model generates a laser track file 816. After a model is selected, if there are one or more models that are selected in any combination, the process runs the ASE aircraft survivability system in step 830 and simulated sensor inputs are provided in step 832. In step 834 a scorecard is compiled for the particular model set run through the track files. The process ends at step 836 when the simulation is over.

Figure 9:
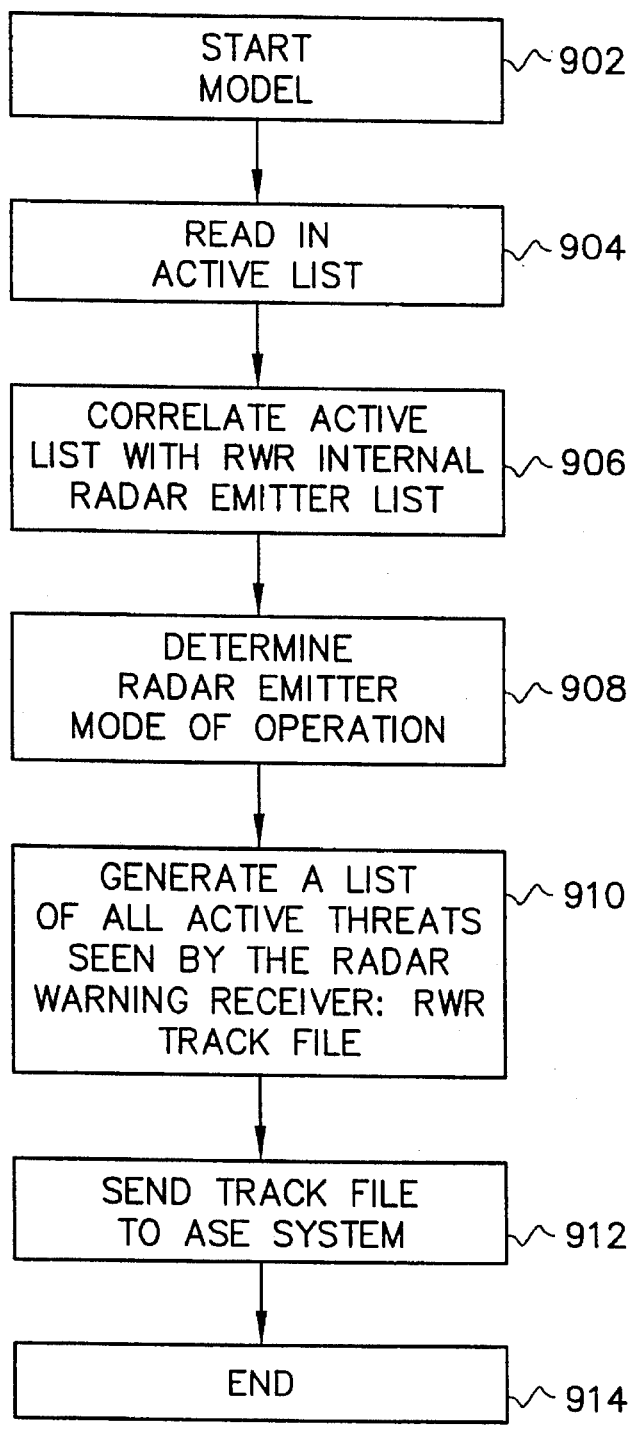
FIG. 9 shows a schematic block diagram for the aircraft survivability equipment sensor model.

FIG. 9 shows the ASE sensor model method of the invention. The model starts at step 902 and proceeds to read in the active threat list in step 904. Each active threat is correlated with a radar warning receiver internal radar admitter list in step 906. The process then flows to step 908 to determine the radar emitter mode of operation. The process then flows to step 910 to generate a list of all active threats seen by the radar warning receiver in the radar warning receiver track file. The process then flows to step 912 to send the track file to the ASE system for a simulated aircraft survivability run. The process then ends at step 914 when the model has completely created a simulated track file.

Figure 10:
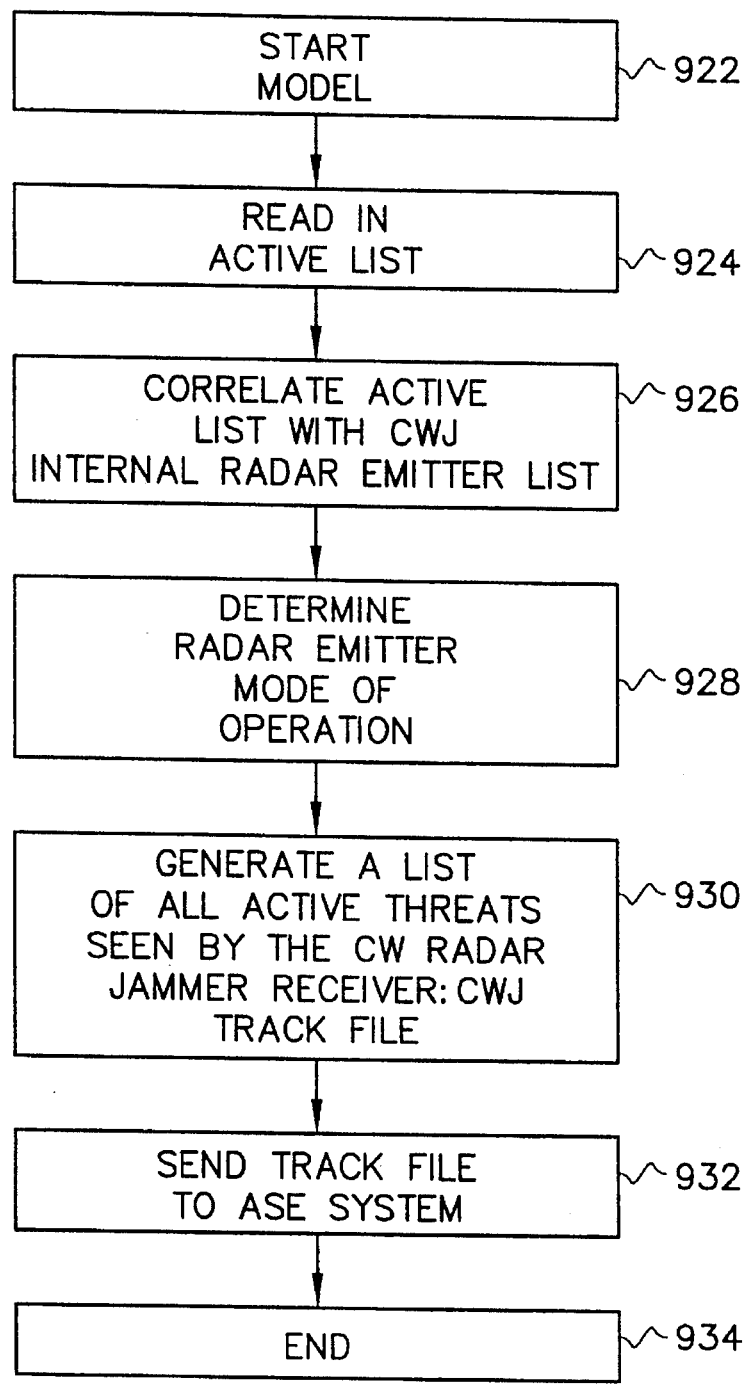
FIG. 10 shows a schematic block diagram for the continuous wave radar jammer sensor model.

Now referring to FIG. 10 which shows the continuous wave jammer sensor model. The model starts at step 922 with the initiation of the model. The process then flows to step 924 to read in the active threat list. The process then flows to 926 to correlate the active threat list with the continuous wave jammer internal radar emitter list. The process then flows to step 928 to determine the radar emitter mode of operation. The process then flows to step 930 to generate a list of all active threats seen by the continuous wave radar jammer receiver. The process generates a continuous wave jammer track file which is sent to the aircraft survivability system in step 932. The process ends in step 934.

Figure 11:
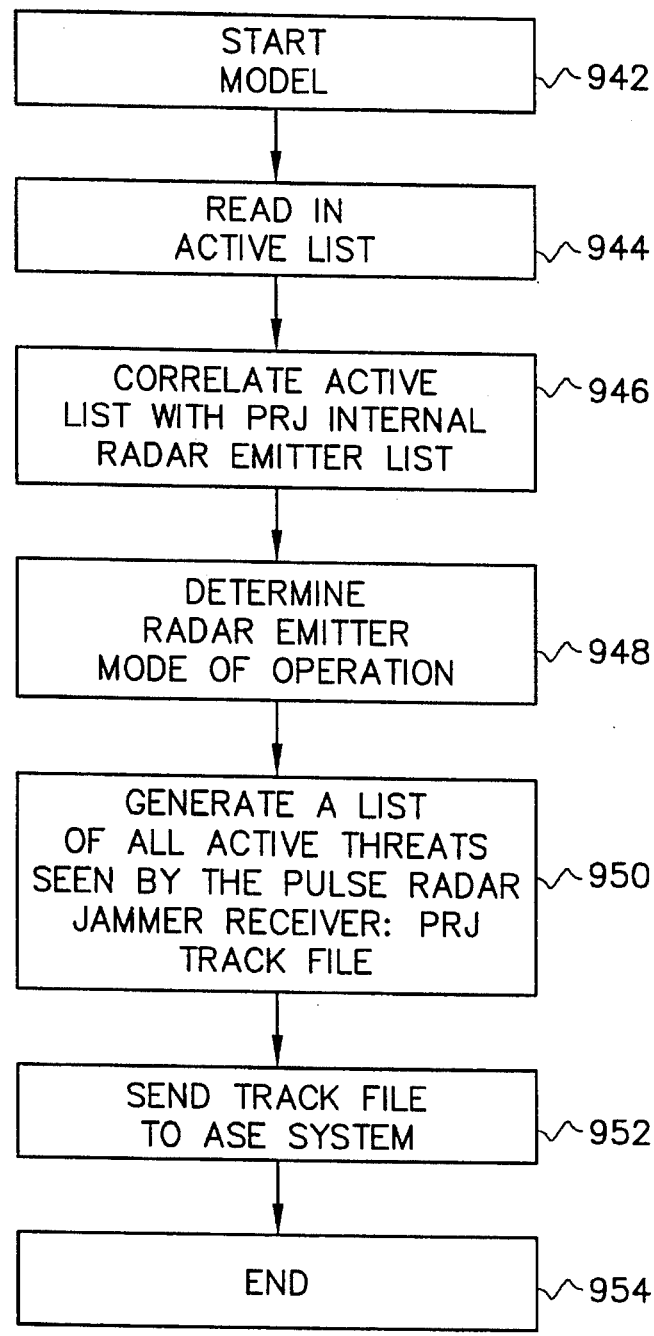
FIG. 11 shows a schematic block diagram for the pulsed radar jammer sensor model.

Now referring to FIG. 11 which shows the pulse radar jamming sensor model. The model starts at 942 and flows to process step 944 to read in the active threat list. The active threat list is correlated with the pulse radar jammer internal radar emitter list in step 946. The process then determines the radar emitter mode of operation in step 948 and a list of all active threats is generated as seen by the pulse radar jammer receiver. The process creates a pulse radar track file in step 950 and sends the track file to the aircraft survivability system in step 952. The process ends at step 954.

Figure 12:
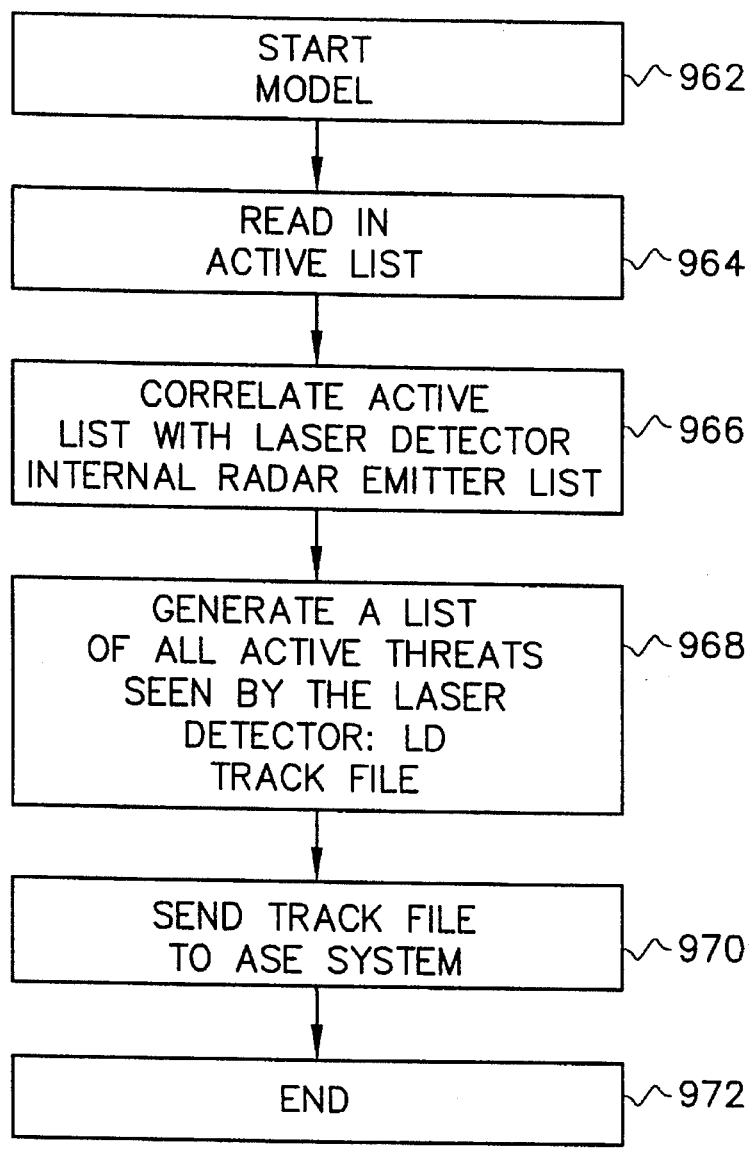
FIG. 12 shows a schematic block diagram for the laser detector sensor model.

Now referring to FIG. 12 which shows the laser detector sensor model. The model starts at step 962 and reads in the active threat list in step 964. The active threat list is correlated with the laser detector internal radar emitter list in step 966. A list of all active threats as seen by the laser detector is generated in step 968. In step 968 a laser detector track file is also created. The laser detector track file is sent to the aircraft survivability system in step 970 and in step 972 the model ends.

Figure 13:
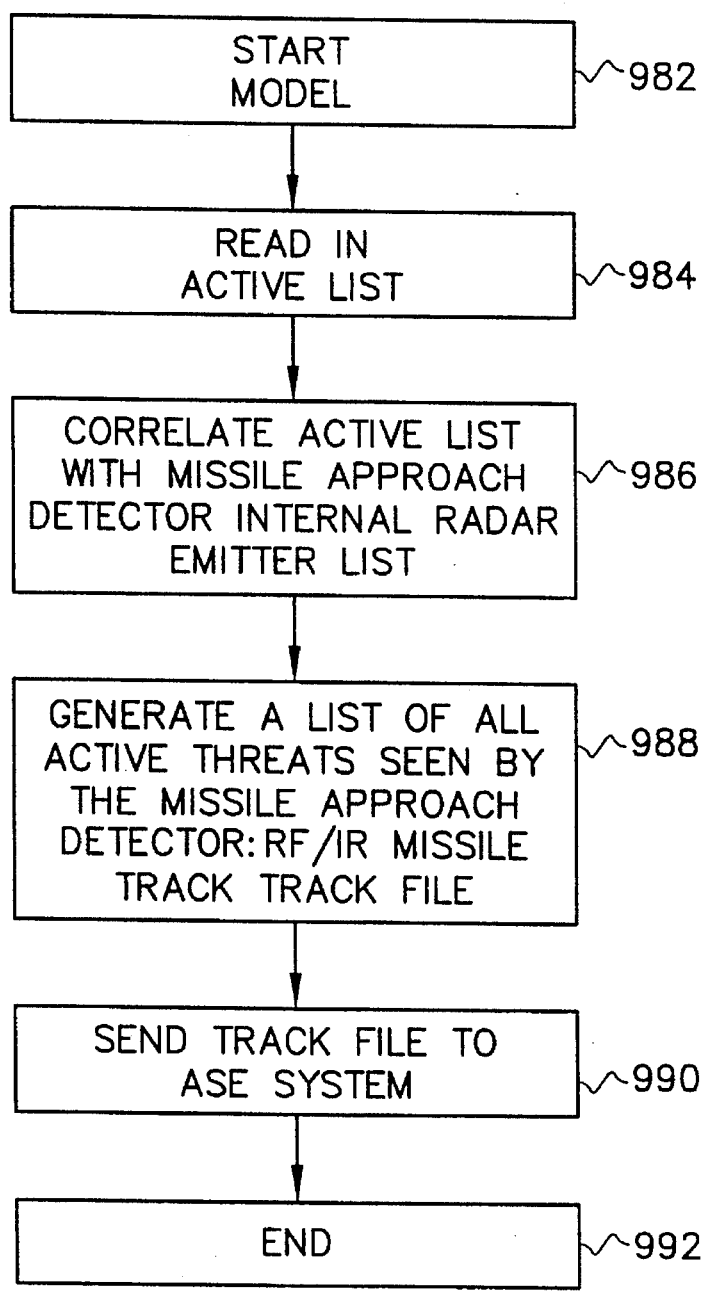
FIG. 13 shows a schematic block diagram for a missile approach detector sensor model.

Now referring to FIG. 13 which shows the method of the invention process flow diagram for the missile approach detector model. The model starts at step 982 and reads in the active threat list in step 984. The active threat list is correlated with the missile approach detector internal radar emitter list in step 986. A list of all active threats as seen by the missile approach detector is generated. A RF/IR track file is created in step 988. The process then sends the RF/IR track file to the aircraft survivability system in step 990. The process ends at 992.

Figure 14:
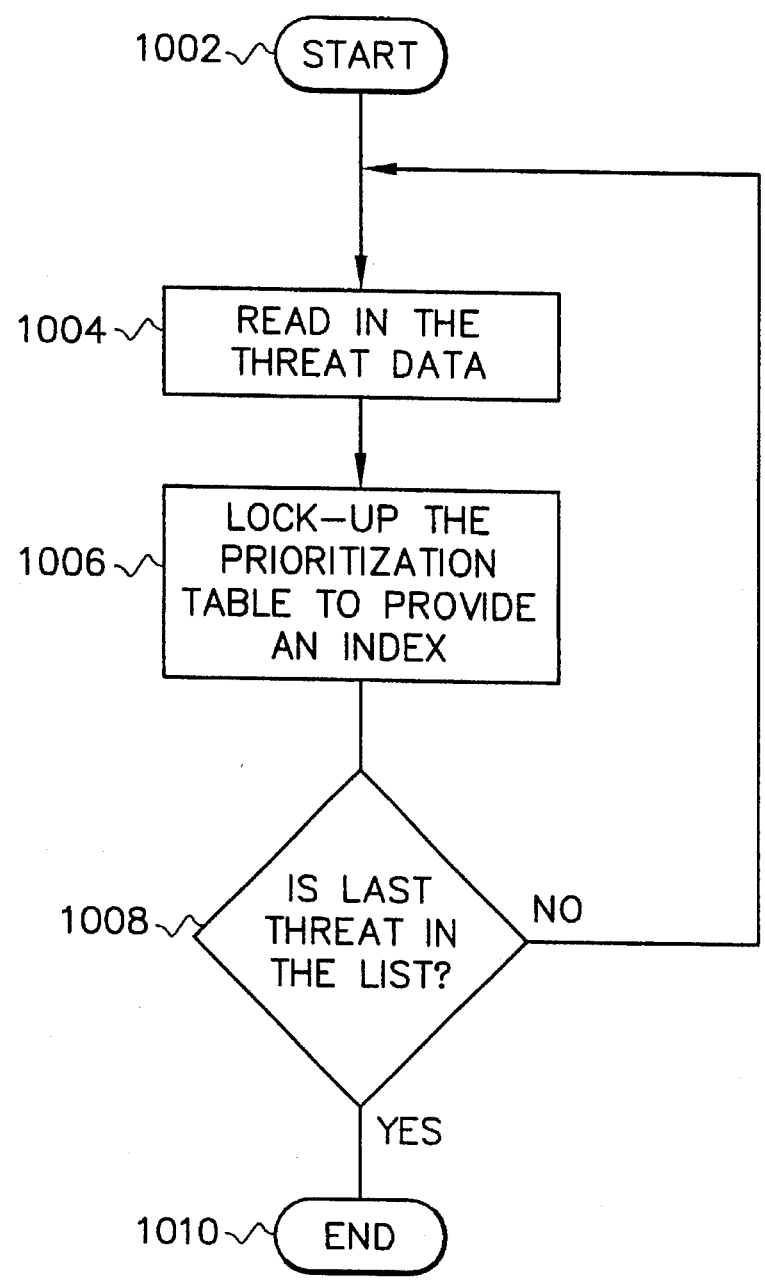
FIG. 14 shows a data prioritization method of the invention.

Now referring to FIG. 14 which shows the method of data prioritization used by one aspect of the invention. The data prioritization algorithm starts at step 1002 and reads in the threat data from the threat data list in step 1004. Each threat data element has a prioritization table that provides an index of priorities. In step 1006 the prioritization table is looked at to provide an index for prioritization. The process then flows to 1008 to determine if this is the last threat in the list. If it is, the process ends. If it is not, the process then reads in the next threat data.

Based on the equipment set-up and system modeling in 1 and 2 above, a set of logic is used to determine the system configuration set-up for training. The operational mode of the RWR will also be set up for the cases of "full" or "partial" coverage.

A Tactical Threat Position page is provided to a user on a display for instructional viewing. This page provides a compact presentation of the flight plan and all threats that are defined for a training mission. From this page, imminent threats are displayed as a solid circle and a non-lethal threat is displayed as a dashed-circle for a monochrome display or red versus green color for a color display.

Each threat defined in the data base will contain a comprehensive set of data such as the radar type associated with the weapon system, radar range, the location of a threat (latitude, longitude and altitude) and the effective range of a weapon system defined in terms of altitude and radius.

New training functions compared to previous ASE Embedded training include the following:

1. Automatic ASE System Configuration Management

This function allows an instructor to set up different training scenarios related to the ASE system configuration. The embedded training automatically switches the system configuration during training as a function of marked time, altitude, or designated locations.

2. Recognizing Non-RWR Threat Presentation

This function generates non-traditional radar warning threats as if these threats were generated from jammer receivers. These threats are represented at outer edge of the threat circle.

3. "Partial" Radar Warning Receiver Back-Up

This function generates threats for presentation on the display to provide a back-up based on the set-up of losing partial threat coverage (e.g. loss of an antenna). The same back-up rules used in the actual integrated ASE algorithms will also be used here.

4. "Full" Radar Warning Receiver Back-Up

This function generates threats detected by the Pulse Radar Jammer model and use the selected threats for presentation as back-up threats.

5. Direction of Incoming Threat

This function generates threats detected by Missile Approach Detector model for warning to set-up evasive maneuver training.

6. Automatic CM Initiation

This function generates automatic chaff initiation against RF missiles. The embedded training will provide indications that a missile is coming as well as chaff count change to reflect this training scenario.

If digital map data are provided for the training area, then the algorithm for determining active threat also changes to reflect the terrain masking conditions as a function of aircraft altitude, terrain elevation and the location of the threat in terms of latitude, longitude and elevation.

Referring to FIG. 15 there is shown a block diagram summarizing the operation and configuration of the present invention. The Aircraft Survivability Equipment Embedded Training Apparatus 22 (ASE Embedded Training Apparatus) is shown having a number of inputs including a training setup input 1502, a digital map input 1504, a flight plan input 1506, and a navigation vector input 1508. the ASE Embedded Training Apparatus 22 can then utilize these inputs (1502, 1504, 1506, 1508) to simulate actual threats during a flight thus providing a training opportunity.

Training setup input 1502 is attached to the threat scenarios database 1510, which receives training setup information and provides information to the ASE Embedded training apparatus 22. More specifically, threat scenarios database 1510 provides information regarding the characteristics of numerous threats. Training setup 1502 provides for the designation of numerous threats at various locations along the pilots proposed flight path.

Threat characteristics are fed from threat scenarios database 1510 into the threat proximity module 1520. Threat proximity module 1520 carries out the threat proximity method as shown in FIGS. 6 & 7. More specifically, threat proximity module 1520 carries out the step of threat proximity 706, flight path intercept 606, earth curvature (threat beyond horizon) 712, an terrain masking (threat hidden by terrain) 710. A more detailed description of these steps can be found in the description regarding FIGS. 6 & 7.

Information regarding the proximity of the threats is then passed on to threat modeling module 1530. Threat modeling module 1530 carries out the threat modeling steps as taught in FIGS. 8–13. In FIG. 8 it is shown how the threat sensor modeling is accomplished. In summary, threat modeling comprises Radar Warning Receiver modeling 820, Pulsed Radar Jammer modeling 822, Continuous Wave Jammer modeling 824, RF/IR Missile Approach modeling 826, and Laser Detector modeling 828. Each modeling method creates a track file (RWR Track File 808, PRJ track file 810, CWJ tack file 812, RF/IR missile track file 814, and laser track file 816). For a more detailed description of these methods and the produced track files, refer back to FIGS. 8–13 and their accompanying discussions.

The track files (808, 810, 812, 814, & 816) are passed on to the IASE simulation model 1540. IASE simulation module 1540 receives the track files and simulates the actual IASE system. This simulation includes data correlation 1542, data prioritization 1544, RWR back-up 1546, ASE configuration management 1548 and video/voice signal generation 1550. IASE simulation module 1540 then provides a threat data display output 1560, an ASE configuration output 1562, a voice message output 1564, and threat display output 1560 alert the pilot of threats during the simulation, while ASE configuration output 1562 helps the pilot evaluate options in response to threats. Training results output 834 produces the aforementioned score card.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. Survivability equipment for an aircraft which includes:
   an aircraft survivability equipment simulator apparatus embedded in the survivability equipment for providing in flight simulation of threats, said simulator apparatus comprising:
   a threat database which includes a plurality of different threats as well as associated parameters for each of the threats;
   a threat proximity module which receives position and flight plan information as well as the associated parameters from the threat database in order to perform a plurality of threat proximity calculations and generate a threat proximity signal;
   a threat modeling module which includes threat models for a plurality of aircraft sensors, the threat modeling module receives the threat proximity signal and generates threat models for any combination of the aircraft sensors selected as a function of the associated parameters, and for each of the threat models generated, a track file is created;
   an IASE simulation module which receives the track files from the threat modeling module and simulates the IASE; and
   means to provide simulation information to a pilot of the aircraft.

2. The simulator apparatus of claim 1 wherein the threat database includes threats detectable by more than one of the aircraft sensors.

3. The simulator apparatus of claim 2 wherein the associated parameters include frequency of threat signal, amplitude of the threat signal, pulse repetition frequency, the pulse repetition interval, angle of arrival, and operational mode of the threat.

4. The simulator apparatus of claim 2 wherein the threat module calculates threat proximity.

5. The simulator apparatus of claim 2 wherein the threat module calculates intercept flight path.

6. The simulator apparatus of claim 2 wherein the threat module calculates threat positions over the horizon taking into account the earth's curvature.

7. The simulator apparatus of claim 2 wherein the threat module calculates threat positions hidden by terrain.

8. The simulator apparatus of claim 2 wherein a track file is generated for simulating a radar warning receiver.

9. The simulator apparatus of claim 2 wherein a track file is generated for simulating a pulsed radar jammer.

10. The simulator apparatus of claim 2 wherein a track file is generated for simulating continuous wave radar jammer.

11. The simulator apparatus of claim 2 wherein a track file is generated for simulating an RF/IR missile approach detector or a laser detector.

12. The simulator apparatus of claim 2 wherein a track file is generated for simulating a laser detector.

13. The simulator apparatus of claim 2 wherein a track file is generated for simulating any combination of a radar warning receiver, pulse radar jammer, continuous wave radar jammer, RF/IR missile approach detector, and a laser detector.

14. The simulator apparatus of claim 2 wherein the simulation provided by the simulation module includes data correlation.

15. The simulator apparatus of claim 2 wherein the simulation provided by the simulation module includes data prioritization.

16. The simulator apparatus of claim 2 wherein the simulation provided by the simulation module includes backup of the radar warning receiver.

17. The simulator apparatus of claim 2 wherein the simulation provided by the simulation module includes ASE system configuration management.

18. The simulator apparatus of claim 2 wherein the simulation provided by the simulation module includes video/voice generation.

19. The simulator apparatus of claim 2 wherein the means to provide simulation information to a pilot outputs a threat data display signal.

20. The simulator apparatus of claim 2 wherein the means to provide simulation information to a pilot outputs a ASE configuration signal.

21. The simulator apparatus of claim 2 wherein the means to provide simulation information to a pilot outputs a voice message signal.

22. The simulator apparatus of claim 2 wherein the means to provide simulation information to a pilot outputs a training results signal.

* * * * *